2,902,421
PHOTOPOLYMERISATION PROCESS

Ronald George Wreyford Norrish, Cambridge, England, assignor of one-half to The Distillers Company Limited, Edinburgh, Scotland, a British company No Drawing. Application February 6, 1956
Serial No. 563,456

Claims priority, application Great Britain
February 18, 1955

4 Claims. (Cl. 204—158)

The present application relates to the polymerisation of ethylenically unsaturated organic monomeric compounds. In particular it relates to the production of polymeric material from such compounds by bringing about their polymerisation by the action of ultra-violet light.

It is known that polymerisable ethylenically unsaturated organic compounds may be polymerised by the action of light of a suitable wave length, particularly ultra-violet light. In such polymerisation reactions the rate of polymerisation and also the length of the polymer chain produced are dependent on the nature and concentration of the monomeric material and also on the intensity and wave length of the light.

An object of the present invention is to provide a process for the production of polymeric material by the photopolymerisation of polymerisable ethylenically unsaturated compounds in which the rate of polymerisation is increased for a given light intensity of the appropriate wave length. A further object is to provide a new class of photopolymerisation accelerators for use in such a process.

Accordingly, the present invention is a process for the production of polymeric material which comprises irradiating a polymerisable ethylenically unsaturated compound with ultra-violet light in the presence therein of a polynuclear aromatic hydrocarbon as photopolymerisation initiator and isolating the polymeric material so produced.

The term ultra violet light is employed in its usual sense to denote radiation having a wave-length less than about 4,000 A. The practical lower limit of the wave length of the radiation used is governed by the transmitting power of the material from which the reaction vessels etc. are made. For instance, soft glass will not transmit below about 3,500 A., Pyrex glass will not transmit below about 3,000 A. and quartz will not transmit below about 2,000 A. For most purposes radiation having a wave length between about 2,000 A. and 4,000 A. is suitable.

A wide range of polymeric materials can be produced according to the process of the present invention. It is particularly useful when applied to the production of polymeric material from polymerisable ethylenically unsaturated compounds which possess one or more unsaturated groups having the following structural formula in their molecules $$CH_2=C<$$

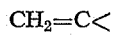

Examples of such compounds are vinyl acetate, styrene, acrylonitrile, methyl methacrylate and butadiene. Mixtures of one or more suitable ethylenically unsaturated compounds may be copolymerised according to the present invention.

The polymerisation of the unsaturated compounds in the process of the present invention can be brought about under both homogeneous and heterogeneous conditions. By heterogeneous polymerisation conditions is meant polymerisation in which the reaction mixture consists of two distinct phases. Such polymerisations are of two types, namely emulsion polymerisations and suspension polymerisations. In emulsion polymerisation the monomer is dispersed throughout the second phase, which is usually aqueous, in the form of a fine emulsion which will not separate out on standing; the resultant polymeric product is in the form of a colloidal suspension (often loosely called an emulsion) which has to be coagulated or "broken" before the polymer can be isolated in the solid form. In suspension polymerisation the monomer is dispersed throughout the second phase, which again is usually water, in the form of discrete particles which have to be maintained in suspension by mechanical means. A polymer produced by a suspension process is in the form of particles or beads which are isolated directly from the reaction mixture by, for example, settling, filtration or centrifuging. By homogeneous polymerisation is meant polymerisation in which the reaction mixture consists solely of one phase. Such polymerisations are carried out either on the unsaturated compound alone, or on a solution of the compound in a suitable inert solvent.

It should be noted that in all aypes of polymerisation according to the present invention it is important that any diluent used in the process, for instance, either as dispersing medium in heterogeneous polymerisation or solvent in homogeneous polymerisation, should not absorb the ultra-violet radiation, which is being used to induce the polymerisation, to such an extent that the polymerisation is seriously retarded or even prevented.

The photopolymerisation initiators of the present invention are polynuclear aromatic hydrocarbons such as, for example, naphthalene, anthracene, phenanthrene, triphenylene, chrysene, pyrene, 3,4-benzphenanthrene, 1,2-bezanthracene, 1,2,5,6-dibenzanthracene, perylene, rubrene and coronene. The readily available polynuclear aromatic hydrocarbons such as naphthalene and anthracene are useful polymerisation initiators. It is known that such hydrocarbons are transitionally formed into excited triplet states by irradiation with ultra-violet light of suitable wave length and it is believed that the polymerisation according to the present invention is initiated by the presence in the reaction mixture of these activated aromatic molecules. The quantity of polynuclear aromatic hydrocarbon present in the polymerisation mixture may vary widely according to the nature of the polymerisable compound and the conditions under which the polymerisation is brought about. Quantities down to a few parts per million of the aromatic hydrocarbon serve to initiate the polymerisation, but much higher quantities may be employed if desired. Care should also be taken to ensure that the initiator chosen for any particular polymerisation reaction is not also an inhibitor for that reaction, because under such conditions the polymerisation rate will be slow.

The irradiation of the polymerisable ethylenically unsaturated compound is carried out under conditions which are well known in the art. The source of light may be within the polymerisation vessel or placed outside so that its rays reach the polymerisation mixture through suitable windows or the like. Ordinary sunlight may be used but it is preferred to use an artificial source of ultra-violet light which gives an abundance of radiation within the desired wave length range. Suitable sources are, for example, a mercury vapour lamp or a carbon electrode arc lamp. It is usually preferred to screen the light used for the photopolymerisation by means of suitable filters so that only light having the desired wave length acts upon the polymerisation mixture.

The polymerisation according to the present invention may be initiated by using ultra-violet light containing radiation having a wide range of wave lengths but in practice it is found that only a comparatively small portion of the light is, in fact, initiating the polymerisation. The actual wave length range of this desired radiation depends primarily on the ultra-violet light absorption of the polynuclear aromatic hydrocarbon used as photopolymerisation initiator and, if possible, it is preferred to use a source of radiation which gives ultra-violet light of a wave length corresponding to the maximum absorption of the polymerisation initiator employed. For many initiators the maximum absorption occurs within the wave length range 2,400 to 3,000 angstrom units and, for instance, in the case of naphthalene the maximum absorption occurs between 2,600 and 2,800 angstrom units.

The choice of suitable ultra-violet light and a suitable photopolymerisation initiator for the polymerisation of any given ethylenically unsaturated compound will depend to some extent upon the absorption of the monomeric compound or compounds employed and that of the polymer or copolymer produced. In order to benefit fully from the controlled polymerisation process of the present invention it is important that the absorption coefficient of the ethylenically unsaturated compound or of the polymeric material produced should be considerably less than the absorption coefficient of the polynuclear photopolymerisation initiator, all coefficients being measured with light of the particular wave length ranges relied on to bring about the polymerisation. By suitable selection of the wave length of the ultraviolet light employed and by suitable choice of the photopolymerisation initiator the polymerisation of most ethylenically unsaturated polymerisable compounds may be brought about under optimum conditions.

The conditions of the polymerisation process according to the present invention may be widely varied as is well known in the art of polymerisation. For instance the temperature of the polymerisation reaction mixture is not at all critical although variations may cause the molecular weight of the produced polymer and the rate of polymerisation to alter. If the polymerisation is to be carried out under heterogeneous conditions, the usual emulsifying agents or suspension stabilisers may be added as required and similarly other compounds known to effect polymerisation reactions or the nature of the products may be present. For instance, although an advantage of the present invention is that it provides a means of producing polymers entirely free from polymerisation catalysts such as peroxides and the like, it may, in certain cases, be advantageous to carry out the polymerisation process of the present invention on polymerisation reaction mixtures containing small proportions of any of the standard polymerisation catalysts. It is important, however, that any compounds added to the polymerisation mixture should not absorb the ultra-violet light which is causing the polymerisation to such an extent that the controlled polymerisation of the process of the present invention is impaired.

The polymeric material produced in the process of the present invention is in the form of a solid, i.e. a precipitate, a suspension or an emulsion, or in the form of a solution and it can readily be isolated by conventional procedures which are well known in the art. Such methods include precipitation, filtration, centrifugation and the like.

Polymers produced according to the invention are similar to polymers produced by conventional methods, i.e. with the aid of a peroxy catalyst, but they can have the advantage that they are not contaminated with any of the conventional polymerisation catalysts.

The following examples illustrate the polymerisation of various ethylenically unsaturated compounds according to the present invention.

Examples 1 to 4

Samples of acrylonitrile containing varying amounts of anthracene as photopolymerisation initiators were placed in turn in a reaction vessel fitted with a stirrer and containing quartz windows and were subjected to the radiation from a mercury lamp after it had been filtered by passage through two glass plates. These optical filters remove most of the radiation having a wave length less than about 3,000 angstrom units. The temperature of the acrylonitrile was about 20° C. The relative amounts of polyacrylonitrile obtained after given polymerisation times are shown in the following table, expressed as parts by weight. In all cases the polymer was recovered by the addition of methanol to the reaction mixture, followed by filtration of the precipitated polymer.

| Example No | 1 | 2 | 3 | 4 |
| --- | --- | --- | --- | --- |
| Percentage by weight of anthracene | 0.0014 | 0.004 | 0.016 | 0.017 |
| Time of irradiation (hours) | 9 | 3.5 | 4.5 | 5.0 |
| Polymer produced | 15.1 | 16.4 | 25 | 42.6 |

In a comparative experiment the irradiation of acrylonitrile in the absence of the anthracene produced no polymerisation.

Example 5

A similar process to that described in Examples 1 to 4 was carried out, but the acrylonitrile contained 0.094% by weight of naphthalene as photopolymerisation initiator and the unscreened radiation from the mercury lamp was employed. After irradiation for 1 hour at 30° C., 200 parts by weight of polyacrylonitrile were recovered by the addition of methanol to the reaction mixture. In the absence of the initiator only 83 parts by weight of polymer were produced under identical conditions.

Example 6

Two portions of vinyl acetate, one of which contained 0.011% by weight of naphthalene, were irradiated at room temperature in similar reaction vessels fitted with Pyrex glass windows. These effectively remove radiation with wave lengths less than about 3000 angstrom units. The degree of polymerisation was followed by dilatometric means. After four hours the sample containing the naphthalene contained approximately 1.5 times as much polyvinylacetate as the sample of pure vinyl acetate. The polymer was recovered by precipitation with methanol and isolated by filtration.

Example 7

A quartz cell was charged with monomeric styrene containing varying amounts of anthracene. The cell was maintained at 70° C. and irradiated with light of wave length 3,500 to 4,200 A. In the absence of radiation the styrene polymerized at a slow rate—the dark reaction. When the monomer was irradiated, the polymerisation rate increased and continued at the higher rate for a time dependent on the amount of anthracene present. As the polymerisation proceeds under irradiation, the anthracene is consumed and its fluorescence disappears from the reaction mixture.

The results obtained are shown in the following table:

| | | | | |
| --- | --- | --- | --- | --- |
| Amount of anthracene present in parts by weight | 2.33 | 4.65 | 9.30 | 18.6 |
| Total polymerisation to disappearance of anthracene, percent by weight | 2.3 | 3.0 | 5.3 | 7.3 |
| Total polymerisation due to the dark reaction, percent by weight | 0.4 | 0.5 | 1.1 | 1.6 |
| Total polymerisation due to irradiation, percent by weight | 1.9 | 2.5 | 4.2 | 5.7 |
| Intrinsic viscosity of product | 2.32 | 2.13 | 1.80 | 1.70 |

A series of different initiators were added to samples of acrylonitrile (A) and methyl methacrylate (M) and the solutions irradiated for varying times and the amount of polymer formed determined by filtering off the produced polymer and washing it with ether. All solutions were maintained under nitrogen during the polymerisation which was carried out at 50° C. Except where indicated the ultra-violet light used was screened by passage through a Chance 0 x 1 filter. The results obtained are given in the following table:

| Initiator | Monomer | Percent of initiator | Time of irradiation, hours | Percent of polymer produced |
|---|---|---|---|---|
| Anthracene | M | 0.0195 | 4 | 2.5 |
|  | A | 0.018 | 3 | 1.1 |
| Naphthalene | M | 0.048 | 4 | 1.5 |
|  | A* | 0.0493 | 4 | 4.6 |
| 9-ethyl anthracene | A* | 0.016 | 4 | 4.2 |
| Pyrene | A* | 0.0245 | 3.75 | 8.5 |
| Chrysene | A* | 0.036 | 3.75 | 8.5 |
| 1:2-benzanthracene | A* | 0.029 | 3.75 | 5.2 |

*No optical filter used.

The perecntage of the initiator in the unpolymerised monomer is expressed on a molar basis, and that of the polymer produced on a weight basis. Attempts to polymerise the acrylonitrile and the methyl methacrylate under the conditions described above but in the absence of any photopolymerisation initiators only gave rise to a very small proportion of polymer, i.e., less than 1%, in the case of methyl methacrylate and no polymer at all in the case of acrylonitrile.

Under similar conditions very good photopolymerisation initiation was obtained using 1,2,5,6-dibenzanthracene.

I claim:
1. A process for the production of polymeric material which comprises irradiating a polymerisable ethylenically unsaturated monomer with ultra-violet light in the presence therein of a polynuclear aromatic hydrocarbon containing up to eight nuclei as photopolymerisation initiator, and isolating the polymeric material so produced.

2. A process as claimed in claim 1, wherein the ethylenically unsaturated monomer contains at least one unsaturated group having the following structural formula in its molecule: $CH_2C<$.

3. A process as claimed in claim 1 wherein the polymerisation initiator is selected from the group consisting of naphthalene, anthracene, pyrene and chrysene.

4. A process as claimed in claim 1 wherein the absorption coefficients of the ethylenically unsaturated monomer and of the polymeric material formed are less than the absorption coefficient of the polymerisation initiator, all coefficients being measured with light of the particular wave lengths relied on to bring about the polymerisation.

References Cited in the file of this patent
UNITED STATES PATENTS
2,548,685    Sachs _____ Apr. 10, 1951
FOREIGN PATENTS
454,224    Canada _____ Jan. 18, 1949